United States Patent
Vaidyanathan et al.

(10) Patent No.: US 12,520,123 B2
(45) Date of Patent: Jan. 6, 2026

(54) DYNAMIC SIM ACTIVATION POLICY UPDATING FOR WIRELESS DEVICES

(71) Applicant: Apple Inc., Cupertino, CA (US)

(72) Inventors: Abishek Kumar Vaidyanathan, Union City, CA (US); Arjun Parthasarathy, San Jose, CA (US); George Lin, San Jose, CA (US); Li Li, Los Altos, CA (US); Mohanasundaram Kattavoor Sivakumar, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 359 days.

(21) Appl. No.: 18/190,396

(22) Filed: Mar. 27, 2023

(65) Prior Publication Data

US 2023/0370832 A1 Nov. 16, 2023

Related U.S. Application Data

(60) Provisional application No. 63/364,614, filed on May 12, 2022.

(51) Int. Cl.
*H04W 8/18* (2009.01)
*H04W 4/50* (2018.01)
*H04W 60/04* (2009.01)

(52) U.S. Cl.
CPC ............ *H04W 8/183* (2013.01); *H04W 4/50* (2018.02); *H04W 60/04* (2013.01)

(58) Field of Classification Search
CPC ........ H04W 4/50; H04W 8/183; H04W 60/04
USPC ...................................... 455/435.1
See application file for complete search history.

(56) References Cited

U.S. PATENT DOCUMENTS 9,854,426 B1 * 12/2017 Wang ................. H04M 1/72406
10,708,766 B1 * 7/2020 Umamaheswaran ... H04W 4/60

* cited by examiner

*Primary Examiner* — Joel Ajayi
(74) *Attorney, Agent, or Firm* — DICKINSON WRIGHT RLLP

(57) ABSTRACT

This application describes techniques for dynamically updating a subscriber identity module (SIM) activation policy for enabling use of an electronic SIM (eSIM) and/or a physical SIM (pSIM) in a wireless device. The wireless device is initially configured with a less restrictive SIM activation policy and during setup is reconfigured to a more restrictive SIM activation policy that locks the wireless device to a particular mobile network operator (MNO) based on an eSIM or a pSIM installed in the wireless device.

20 Claims, 12 Drawing Sheets

DYNAMIC SIM ACTIVATION POLICY UPDATING FOR WIRELESS DEVICES

CROSS-REFERENCE TO RELATED APPLICATIONS

The present application claims the benefit of U.S. Provisional Application No. 63/364,614, entitled "DYNAMIC SIM ACTIVATION POLICY UPDATING FOR WIRELESS DEVICES," filed May 12, 2022, the content of which is incorporated by reference herein in its entirety for all purposes.

FIELD

The described embodiments set forth techniques for dynamically updating a subscriber identity module (SIM) activation policy to enable use of an electronic SIM (eSIM) or a physical SIM (pSIM) in a wireless device. An eSIM may also be referred to as an embedded SIM. The wireless device is initially configured with a less restrictive SIM activation policy and during setup is reconfigured to a more restrictive SIM activation policy that locks the wireless device to a particular mobile network operator (MNO) based on an eSIM or a pSIM installed in the wireless device.

BACKGROUND

Many wireless devices are configured to use removable Universal Integrated Circuit Cards (UICCs) that enable the wireless devices to access services provided by Mobile Network Operators (MNOs). In particular, each UICC includes at least a microprocessor and a read-only memory (ROM), where the ROM is configured to store an MNO profile that the wireless device can use to register and interact with an MNO to obtain wireless services via a cellular wireless network. A profile may also be referred to as subscriber identity module (SIM). Typically, a UICC takes the form of a small removable card, commonly referred to as a SIM card, which is inserted into a UICC-receiving bay of a wireless device. In more recent implementations, UICCs are being embedded directly into system boards of wireless devices as embedded UICCs (eUICCs), which can provide advantages over traditional, removable UICCs. The eUICCs can include a rewritable memory that can facilitate installation, modification, and/or deletion of one or more electronic/embedded SIMs (eSIMs) on the eUICC, where the eSIMs can provide for new and/or different services and/or updates for accessing extended features provided by MNOs. An eUICC can store a number of MNO profiles—also referred to herein as eSIMs—and can eliminate the need to include UICC-receiving bays in wireless devices.

MNOs can offer directly, via their own stores or online, and indirectly, via third party retailers, subsidies for purchase of a wireless device by a user, usually with a contract for cellular wireless service that locks the wireless device to be used with a SIM associated with the MNO that subsidized the purchase. Presently, locked wireless devices use physical SIM (pSIM) cards configured for a particular MNO, while unlocked wireless devices can use either pSIM cards or downloadable eSIMs on an eUICC if available in the wireless device. A locked wireless device can include a more restrictive SIM activation policy that limits what type of SIM profile can be installed and used in the locked mobile device, e.g., only those SIM profiles from a particular MNO, while a wireless device unassigned to a particular MNO can include a less restrictive SIM activation policy that allows for installation and use of a broader array of SIM profiles. Installing different SIM activation policies into wireless devices at a time of manufacture and/or as part of a sales order and shipment process complicates production and inventory management of the wireless devices. Additionally, some wireless devices may not include a bay for installation of a pSIM card and may rely solely on eSIMs installed on an eUICC of the wireless device. It is anticipated that MNOs will continue to offer subsidy plans for purchase of wireless devices, and with eSIMs increasing in use, there exists a need for a mechanism to allow for pre-installed and/or downloadable eSIMs with a more restrictive, e.g., locked, SIM activation policy. Furthermore, there exists a need for mechanisms to update a SIM activation policy of a wireless device after manufacture to allow for different configurations of the wireless device when setup by a user, such as from a flexible, less restrictive SIM activation policy, e.g., a SIM activation policy applicable to multiple MNOs, to a more restrictive SIM activation policy, e.g., a SIM activation policy restricted to a particular MNO.

SUMMARY

This Application sets forth techniques for dynamically updating a subscriber identity module (SIM) activation policy that controls use of electronic/embedded SIMs (eSIMs) and/or physical SIMs (pSIMs) in a wireless device. The wireless device is initially configured with a less restrictive SIM activation policy that is applicable to different MNOs and during setup is reconfigured to a more restrictive SIM activation policy that locks the wireless device to a particular mobile network operator (MNO) based on an eSIM or a pSIM installed in the wireless device. Reconfiguration of the SIM activation policy can be based on one or more of: a sales order contract for purchase of the wireless device, a cellular wireless service subscription associated with use of the wireless device, an MNO provided subsidy, and a specific eSIM or pSIM installed in the wireless device during an initialization process.

During an initialization process, a wireless device sends a device activation message to a network-based server managed by an original equipment manufacturer (OEM) of the wireless device, the device activation message including a unique hardware identifier for the wireless device, e.g., a device serial number or international mobile equipment identifier (IMEI) value. The network-based server determines, based on the unique hardware identifier, whether a flexible SIM policy applies to the wireless device. When the flexible SIM policy is applicable, the network-based server sends a device activation message that blocks use of all fully functional cellular wireless SIM profiles by the wireless device. Subsequently, after installation of a UICC that includes a pSIM in the wireless device, or after downloading and installation of an eSIM on an eUICC of the wireless device, the wireless device sends a baseband activation request message to the network-based server, the baseband activation message including a unique identifier for the pSIM or eSIM installed in the wireless device, e.g., an international mobile subscriber identity (IMSI) value. The network-based server locks the wireless device to a target SIM activation policy of an MNO associated with the installed pSIM or eSIM. The network-based server sends to the wireless device a baseband activation response message that includes an updated SIM activation policy rule that restricts the wireless device to use fully functional cellular wireless SIM profiles of the MNO associated with the installed pSIM or eSIM. The wireless device activates the installed pSIM or eSIM to allow access to cellular wireless services of the MNO associated with the installed pSIM or eSIM.

Other aspects and advantages of the invention will become apparent from the following detailed description taken in conjunction with the accompanying drawings which illustrate, by way of example, the principles of the described embodiments.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
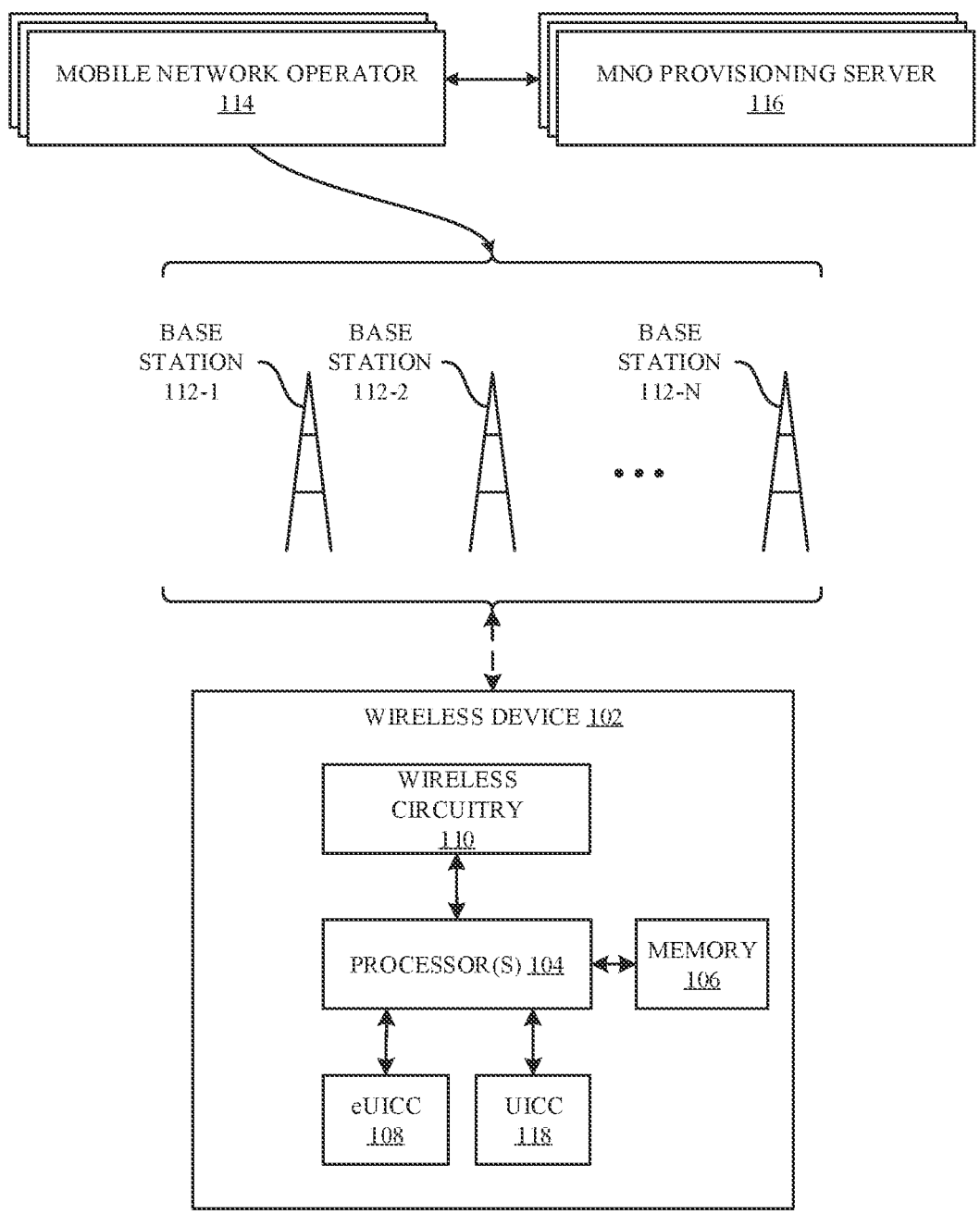
FIG. 1 illustrates a block diagram of different components of an exemplary system configured to implement the various techniques described herein, according to some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

This application sets forth techniques for dynamically updating a subscriber identity module (SIM) activation policy that controls use of electronic/embedded SIMs (eSIMs) and/or physical SIMs (pSIMs) in a wireless device. The wireless device is initially configured with a less restrictive SIM activation policy that is applicable to different MNOs and during setup is reconfigured to a more restrictive SIM activation policy that locks the wireless device to a particular mobile network operator (MNO) based on an eSIM or a pSIM installed in the wireless device. Reconfiguration of the SIM activation policy can be based on one or more of: a sales order contract for purchase of the wireless device, a cellular wireless service subscription associated with use of the wireless device, an MNO provided subsidy, and a specific eSIM or pSIM installed in the wireless device during an initialization process.

The wireless device is configured and shipped, e.g., to an MNO-specific retailer or to a third-party retailer that offers wireless devices from multiple MNOs, without a pSIM or eSIM installed at a time of manufacture. The wireless device as shipped to the retailer does not include a restrictive locked SIM activation policy for a particular MNO. A user can purchase the wireless device, at a retail store or via an online process, with a restrictive contract that requires use of the wireless device for cellular wireless services with a particular MNO, such as when the particular MNO subsidizes purchase of the wireless device for the user. As initially configured out-of-the box and before setup, the wireless device can be unassociated with any particular MNO. During an initialization process, the wireless device sends a device activation message to a network-based server managed by an original equipment manufacturer (OEM) of the wireless device, where the device activation message includes a unique hardware identifier for the wireless device, e.g., a device serial number or international mobile equipment identifier (IMEI) value. The network-based server determines, based on the unique hardware identifier, whether a flexible SIM activation policy applies to the wireless device. When the flexible SIM activation policy is applicable, the network-based server sends to the wireless device a device activation message that temporarily blocks use of all fully functional cellular wireless SIM profiles by the wireless device. Subsequently, after installation of a UICC that includes a pSIM in the wireless device, or after downloading and installation of an eSIM on an eUICC of the wireless device, the wireless device sends a baseband activation request message to the network-based server, where the baseband activation message includes a unique identifier for the pSIM or eSIM installed in the wireless device, e.g., an international mobile subscriber identity (IMSI) value. The network-based server locks the wireless device to a target SIM activation policy of an MNO associated with the installed pSIM or eSIM. The network-based server sends to the wireless device a baseband activation response message that includes an updated SIM activation policy rule that restricts the wireless device to use fully functional cellular wireless SIM profiles of the MNO associated with the installed pSIM or eSIM. The wireless device activates the installed pSIM or eSIM to allow access to cellular wireless services of the MNO associated with the installed pSIM or eSIM.

In some embodiments, the wireless device sends a SIM installation message to a second network-based server managed by the OEM of the wireless device after installation of an eSIM in the wireless device. The SIM installation message includes a unique identifier for the installed eSIM, e.g., an IMSI value for the installed eSIM. The second network-based server determines based on the unique identifier for the installed eSIM, whether the installed eSIM is eligible for use by the wireless device under the flexible SIM activation policy applicable to the wireless device. The second-network based server returns to the wireless device an indication, e.g., a true or false value, that indicates whether the installed eSIM is eligible for use by the wireless device under the flexible SIM activation policy presently installed in and applicable to the wireless device.

In some embodiments, a back-end server of a particular MNO communicates with an OEM network-based server indicating that a purchased wireless device, prior to being initialized, is restricted for use with the particular MNO. The OEM network-based server locks a target SIM activation policy for the wireless device to the particular MNO. Subsequently, the locked target SIM activation policy is downloaded to the wireless device when a pSIM card for the MNO is installed or an applicable eSIM for the MNO is downloaded an installed to the wireless device. In some embodiments, the locked target SIM activation policy is loaded to the wireless device without loading a flexible SIM activation policy applicable to multiple MNOs to the wireless device during the initialization process, as selection of the MNO to which the wireless device is locked occurs prior to initialization of the wireless device. In some embodiments, a wireless device is manufactured and shipped with a flexible, temporary SIM activation policy preloaded in the wireless device. In some embodiments, the wireless device is manufactured and shipped with security libraries and/or directives to allow the wireless device to proceed through an initialization process while in a restricted mode that precludes use of fully functional cellular wireless SIM profiles. In some embodiments, installation of a pSIM or an eSIM in the wireless device occurs after completion of an initialization process, and the wireless device can operate without fully functional cellular wireless service capabilities until the pSIM or eSIM is installed, enabled, and activated.

These and other embodiments are discussed below with reference to FIGS. 1-8; however, those skilled in the art will readily appreciate that the detailed description given herein with respect to these figures is for explanatory purposes only and should not be construed as limiting.

FIG. 1 illustrates a block diagram of different components of a system 100 that is configured to implement the various techniques described herein, according to some embodiments. More specifically, FIG. 1 illustrates a high-level overview of the system 100, which, as shown, includes a wireless device 102, which can also be referred to as a wireless device, a wireless device, a mobile device, a user equipment (UE) and the like, a group of base stations 112-1 to 112-N that are managed by different Mobile Network Operators (MNOs) 114, and a set of provisioning servers 116 that are in communication with the MNOs 114. Additional MNO infrastructure servers, such as used for account management and billing are not shown. The wireless device 102 can represent a mobile computing device (e.g., an iPhone® or an iPad® by Apple®), the base stations 112-1 to 112-n can represent cellular wireless network entities including evolved NodeBs (eNodeBs or eNBs) and/or next generation NodeBs (gNodeBs or gNB) that are configured to communicate with the wireless device 102, and the MNOs 114 can represent different wireless service providers that provide specific cellular wireless services (e.g., voice and data) to which the wireless device 102 can subscribe, such as via a subscription account for a user of the wireless device 102.

As shown in FIG. 1, the wireless device 102 can include processing circuitry, which can include one or more processor(s) 104 and a memory 106, an embedded Universal Integrated Circuit Card (eUICC) 108, and a baseband wireless circuitry 110 used for transmission and reception of cellular wireless radio frequency signals. The baseband wireless circuitry 110 can include analog hardware components, such as antennas and amplifiers, as well as digital processing components, such as signal processors (and/or general/limited purpose processors) and associated memory. In some embodiments, the wireless device 102 includes one or more physical UICCs 118, also referred to as Subscriber Identity Module (SIM) cards, in addition to or substituting for the eUICC 108. The components of the wireless device 102 work together to enable the wireless device 102 to provide useful features to a user of the wireless device 102, such as cellular wireless network access, non-cellular wireless network access, localized computing, location-based services, and Internet connectivity. The eUICC 108 can be configured to store multiple electronic SIMs (eSIMs) for accessing cellular wireless services provided by different MNOs 114 by connecting to their respective cellular wireless networks through base stations 112-1 to 112-N. For example, the eUICC 108 can be configured to store and manage one or more eSIMs for one or more MNOs 114 for different subscriptions to which the wireless device 102 is associated. To be able to access services provided by an MNO, an eSIM is reserved for subsequent download and installation to the eUICC 108. In some embodiments, the eUICC 108 obtains one or more eSIMs from one or more associated provisioning servers 116 as part of a device initialization of the wireless device 102, such as when purchasing a new wireless device 102. The provisioning servers 116 can be maintained by a manufacturer of the wireless device 102, the MNOs 114, third party entities, and the like. Communication of eSIM data between an MNO provisioning server 116 and the eUICC 108 (or between the MNO provisioning server 116 and processing circuitry of the wireless device 102 external to the eUICC 108, e.g., the processor 104) can use a secure communication channel.

The wireless device 102, upon initial acquisition by a user, can lack an activated fully functional cellular wireless eSIM on the eUICC 108 and can also not include a UICC 118 with an activated physical SIM (pSIM) installed in the wireless device 102. The user of the wireless device 102 can be required to install a UICC 118 (pSIM card) or to download a fully functional eSIM from an MNO provisioning server 116. At a time of purchase, the wireless device 102 can be intended to be restricted for use with a particular MNO, such as when the particular MNO subsidizes purchase of the wireless device 102. During or subsequent to initialization of the wireless device 102, a user can install a pSIM or eSIM associated with the particular MNO, and a SIM activation policy can be updated in the wireless device 102 to restrict the wireless device 102 to be used only with pSIMs or eSIMs associated with the particular MNO.

Figure 2:
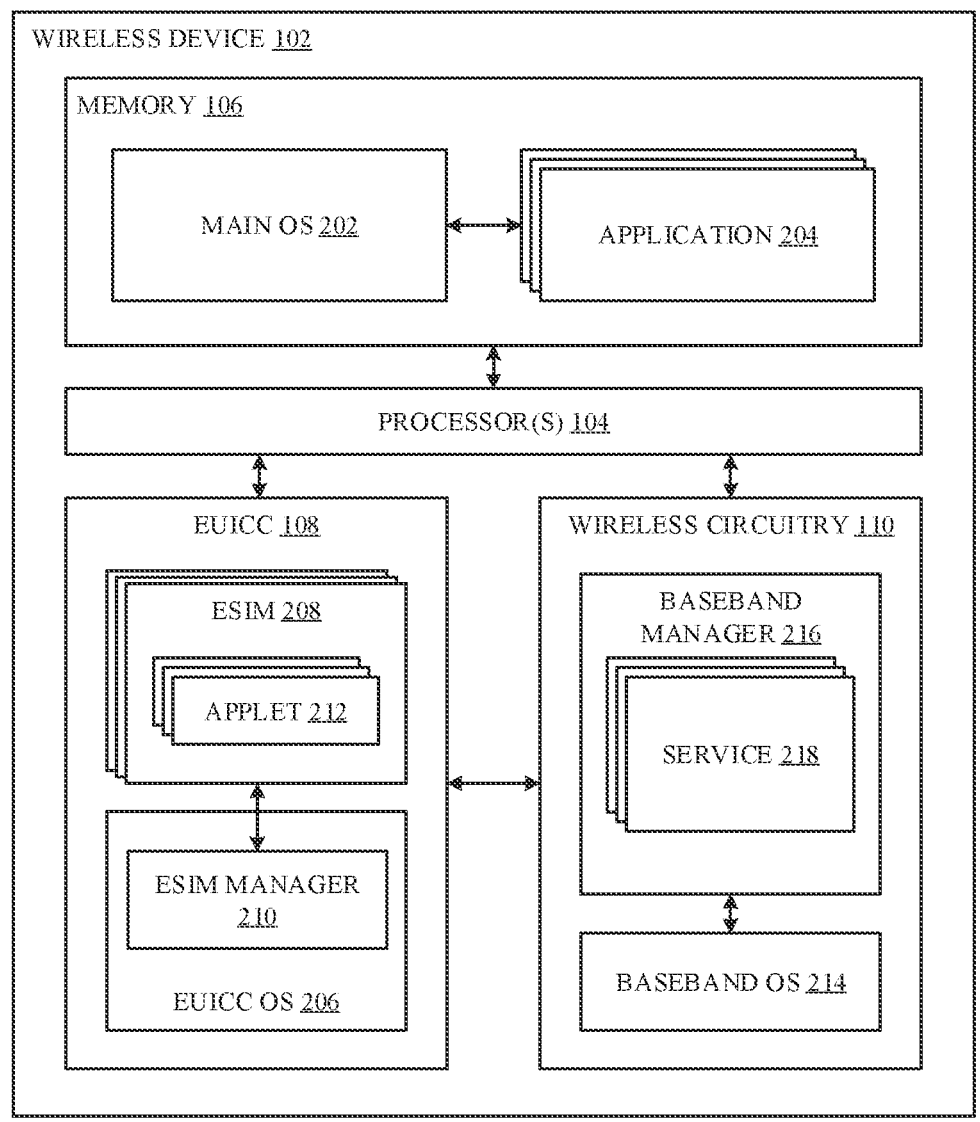
FIG. 2 illustrates a block diagram of a more detailed view of exemplary components of the system of FIG. 1, according to some embodiments.

FIG. 2 illustrates a block diagram of a more detailed view 200 of particular components of the wireless device 102 of FIG. 1, according to some embodiments. As shown in FIG. 2, the processor(s) 104, in conjunction with memory 106, can implement a main operating system (OS) 202 that is configured to execute applications 204 (e.g., native OS applications and user applications). As also shown in FIG. 2, the eUICC 108 can be configured to implement an eUICC OS 206 that is configured to manage hardware resources of the eUICC 108 (e.g., a processor and a memory embedded in the eUICC 108). The eUICC OS 206 can also be configured to manage eSIMs 208 that are stored by the eUICC 108, e.g., by downloading, installing, deleting, enabling, disabling, modifying, or otherwise performing management of the eSIMs 208 within the eUICC 108 and providing baseband wireless circuitry 110 with access to the eSIMs 208 to provide access to wireless services for the wireless device 102. The eUICC 108 OS can include an eSIM manager 210, which can perform management functions for various eSIMs 208. According to the illustration shown in FIG. 2, each eSIM 208 can include a number of applets 212 that define the manner in which the eSIM 208 operates. For example, one or more of the applets 212, when implemented in conjunction with baseband wireless circuitry 110 and the eUICC 108, can be configured to enable the wireless device 102 to communicate with an MNO 114 and provide useful features (e.g., phone calls and internet access) to a user of the wireless device 102.

As also shown in FIG. 2, the baseband wireless circuitry 110 of the wireless device 102 can include a baseband OS 214 that is configured to manage hardware resources of the baseband wireless circuitry 110 (e.g., a processor, a memory, different radio components, etc.). According to some embodiments, the baseband wireless circuitry 110 can implement a baseband manager 216 that is configured to interface with the eUICC 108 to establish a secure channel with an MNO provisioning server 116 and obtaining information (such as eSIM data) from the MNO provisioning server 116 for purposes of managing eSIMs 208. The baseband manager 216 can be configured to implement services 218, which represents a collection of software modules that are instantiated by way of the various applets 212 of enabled eSIMs 208 that are included in the eUICC 108. For example, services 218 can be configured to manage different connections between the wireless device 102 and MNOs 114 according to the different eSIMs 208 that are enabled within the eUICC 108.

Figure 3:
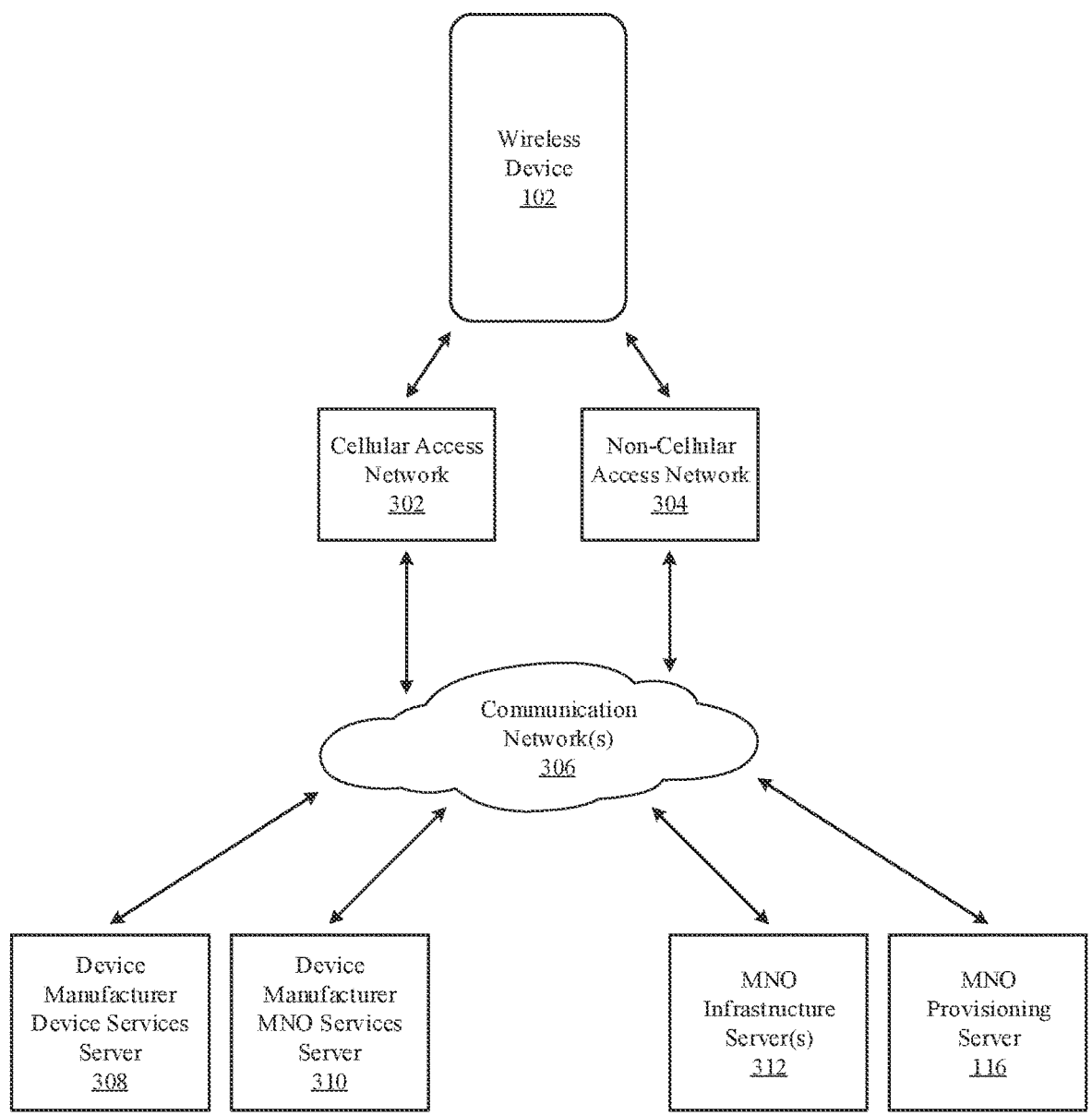
FIG. 3 illustrates an exemplary device activation and provisioning network for a wireless device, according to some embodiments.

FIG. 3 illustrates a diagram 300 of elements of communication network involved in device activation and SIM provisioning, installation, and activation for a wireless device 102. Data connectivity for the wireless device 102 can be required for device activation and SIM provisioning. In some scenarios, a non-cellular access network 304 can be available for the wireless device 102 to connect to various device manufacturer managed and/or MNO 114 managed servers via intervening communication networks 306. In some scenarios, a non-cellular access network 304 may be not available, and the wireless device 102 may rely on access to a cellular access network 302 for activation of the wireless device 102 and for SIM provisioning, e.g., downloading and installation of an eSIM 208, to the wireless device 102. In some embodiments, the wireless device 102 includes a limited functionality SIM profile (e.g., a pre-installed limited functionality bootstrap eSIM or a pre-installed limited functionality pSIM) that can provide limited access to the cellular access network 302 for provisioning an eSIM 208, e.g., when access to a non-cellular access network 304 that can interconnect to the required servers is not available. An OEM manufacturer of the wireless device 102 can maintain multiple network-based servers to assist with management of the wireless device 102, e.g., a device manufacturer managed device services server 308, which can provide management for device manufacturer supplied services to the wireless device 102, and a device manufacturer managed MNO services server 310, which can provide a device manufacturer anchor for management of MNO supplied services to the wireless device 102. An MNO 114 can also provide their own set of servers, including various MNO infrastructure servers 312 for managing cellular access, authentication, authorization, subscription, billing, and other associated management functions for cellular wireless services for the wireless device 102, and MNO provisioning servers 116 from which SIM firmware, e.g., eSIMs 208, OTA updates for eSIMs 208 or pSIMs, etc., can be accessed, with appropriate authentication, by the wireless device 102.

Figure 4A:
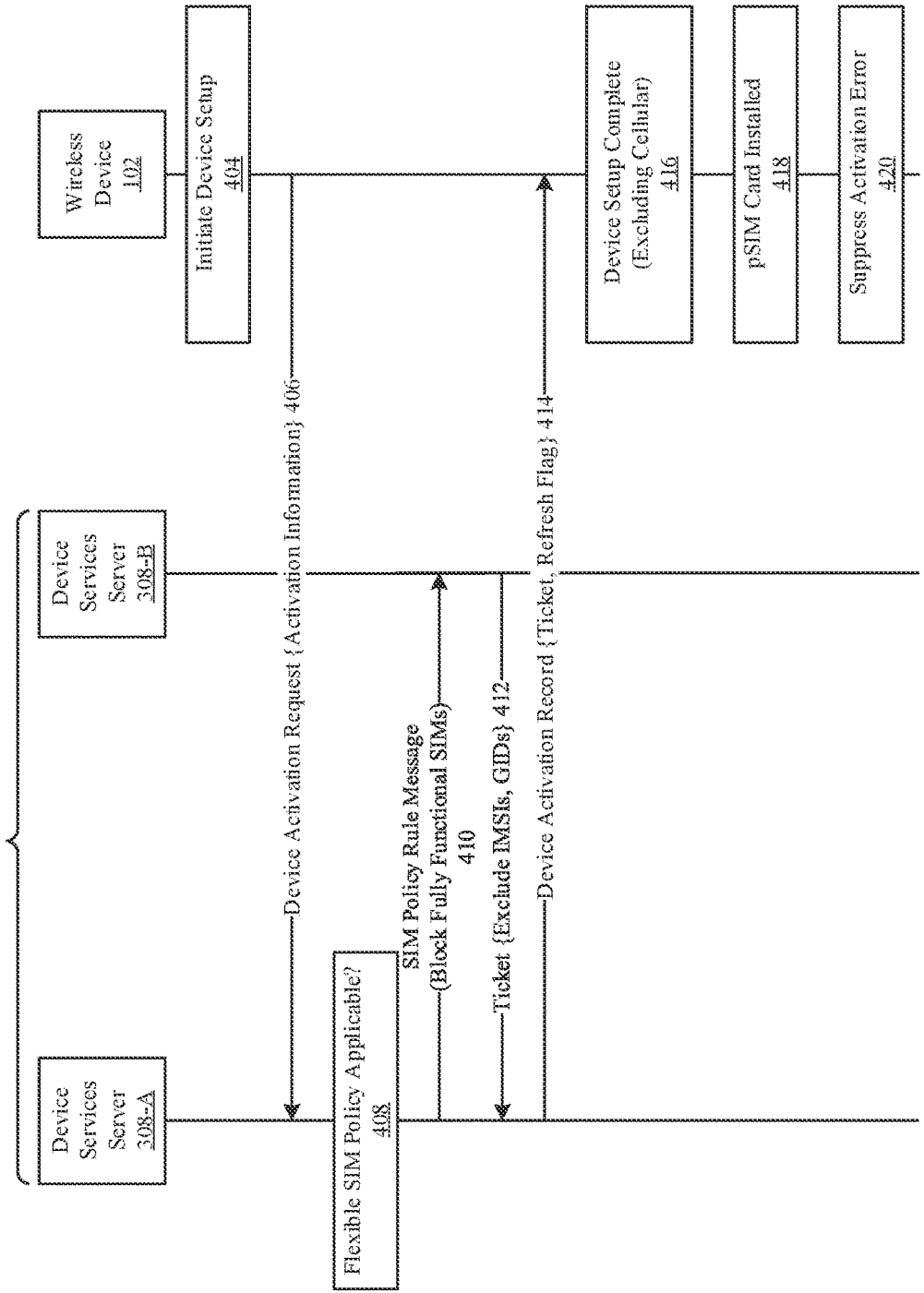
FIGS. 4A and 4B illustrate an exemplary flexible SIM activation flow for a physical SIM (pSIM) equipped wireless device, according to some embodiments.

FIG. 4A illustrates a diagram 400 of an exemplary flexible SIM activation flow for a pSIM equipped wireless device 102. At 404, a device setup process is started, such as part of an out-of-box unbricking of the wireless device 102 or after a resetting the wireless device 102 to a device factory settings. At 406, the wireless device 102 sends to a first device services server 308-A managed by an OEM of the wireless device 102 a device activation request message that includes activation information for configuring the wireless device 102. The activation information includes a unique hardware device identifier for the wireless device 102, such as a device serial number or an international mobile equipment identifier (IMEI) value. At 408, the first device services server 308-A determines whether a flexible SIM activation policy (which can also be referred to as a temporary or loaner SIM activation policy) applies to the wireless device 102 identified by the unique hardware device identifier provided in the activation information of the device activation request message. In some embodiments, the wireless device 102 ships from a manufacturing facility tagged for initial configuring with the flexible SIM activation policy. In some embodiments, the wireless device 102 ships with a set of security libraries and directives to allow the device to proceed through the device setup process in a restricted mode without requiring an activated SIM to be installed in the wireless device 102. The flexible SIM activation policy allows the wireless device 102 to be setup without a fully functional cellular wireless capability enabled and restricts wireless capability to non-cellular wireless access connectivity, such as via a wireless local area network (WLAN) or wireless personal area network (WPAN) until a fully functional cellular wireless SIM profile is installed and activated in the wireless device 102. At 410, the first device services server 308-A sends a SIM policy rule message that blocks use of fully functional cellular wireless SIM profiles for the wireless device 102 to a second devices services server 308-B. At 412, the second device services server 308-B returns to the first device services server 308-A a device activation ticket that includes a rule to exclude the use of all IMSI and group identifier (GID) values for any fully functional cellular wireless SIM profiles. At 515, the first device services server 308-A sends to the wireless device 102 a device activation record that includes the device activation ticket and a refresh flag. At 416, the wireless device 102 completes the device setup process without activation of cellular wireless capability for the wireless device 102. At this point, the wireless device 102 can be used without cellular wireless capability.

Subsequently, at 418, a user of the wireless device 102 installs a UICC 118 (pSIM card) that includes a pSIM profile. In some embodiments, the pSIM profile is associated with a particular MNO 114 with which the user of the wireless device 102 has established a cellular wireless subscription for access to cellular wireless services of the particular MNO 114. In some embodiments, the user purchases the wireless device 102 with a service contract that includes a subsidy lock that limits cellular wireless access by the wireless device 102 to the particular MNO 114. At 420, the wireless device 102 suppresses a cellular wireless service activation error, e.g., refrains from providing an on-display notification, that occurs as a result of the previously installed SIM policy rule that temporarily blocks use of fully functional cellular wireless SIM profiles by the wireless device 102.

Figure 4B:
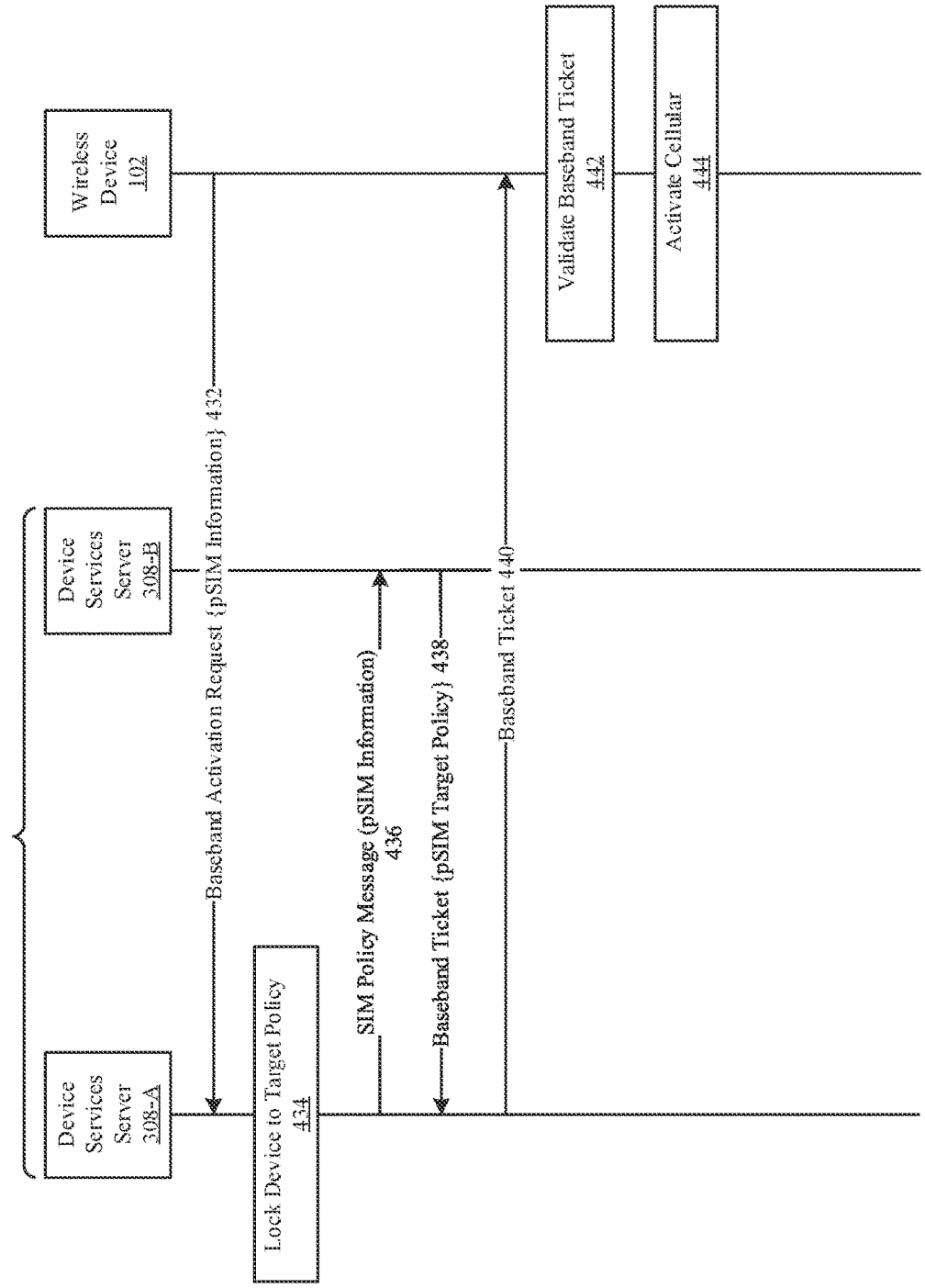

FIG. 4B illustrates a diagram 430 continuing the flexible SIM activation flow for the pSIM equipped wireless device 102. At 432, the wireless device 102 sends to the first device services server 308-A a baseband activation request message that includes information identifying the pSIM profile resident on the UICC 118 installed in the wireless device 102. In some embodiments, the information includes a unique identifier for the pSIM profile, such as an international mobile subscription identifier (IMSI) value. In some embodiments, the information further includes GID values for the pSIM profile. At 434, the first device services server 308-A locks the wireless device 102 to a target SIM activation policy that requires use of the wireless device 102 with an MNO 114 associated with the pSIM profile. In some embodiments, the first device services server 308-A uses the information included in the baseband activation request message to identify the MNO 114 and/or determine compatibility of the wireless device 102 for use with the MNO 114 associated with the pSIM profile. At 436, the first device services server 308-A sends a SIM policy message that includes the information identifying the pSIM profile to the second device services server 308-B. At 438, the second devices services server 308-B returns a baseband ticket with a target SIM policy tailored to the pSIM profile to the first devices services server 308-A. At 440, the first device services server 308-A sends to the wireless device 102 a baseband ticket, which the wireless device 102 validates, at 442, such as based on a certificate pre-installed in the wireless device 102. The baseband ticket can indicate to the wireless device 102 that use of the pSIM profile is allowed for the wireless device 102 and that the wireless device 102 is locked to the MNO 114 associated with the pSIM profile for cellular wireless service access. At 444, the baseband cellular wireless capability of the pSIM profile is activated to allow the wireless device 102 to access cellular wireless services of the MNO 114 associated with the pSIM profile. In some embodiments, the wireless device 102 is restricted from installing and activating a pSIM profile or an eSIM profile 208 associated with a different MNO 114 based on the updated SIM policy that locks the wireless device 102 to the MNO 114 associated with the already installed pSIM profile. In some embodiments, the functions provided by the devices services servers 308-A, 308-B can be realized using a single server or more than two distinct servers.

Figure 5A:
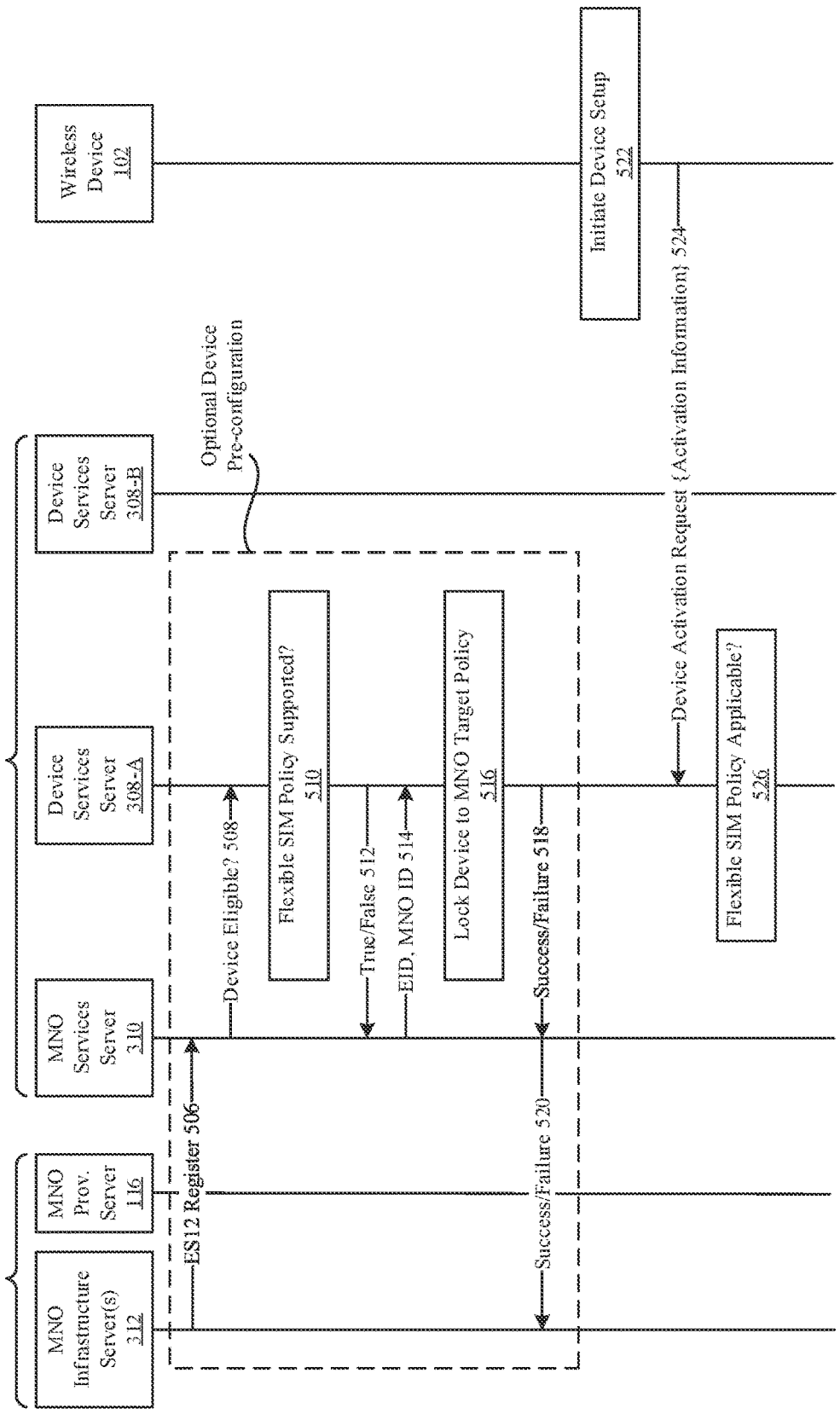
FIGS. 5A, 5B, and 5C illustrate an exemplary flexible SIM activation flow for an electronic SIM (eSIM) equipped wireless device, according to some embodiments.

FIG. 5A illustrates a diagram 500 of an exemplary flexible SIM activation flow for an eSIM 208 equipped wireless device 102. An initial out-of-box device setup process can be preceded optionally by a device pre-configuration process initiated by a particular MNO 114 with which the wireless device 102 is to be associated. At 506, an MNO infrastructure server 312 sends, to a device manufacturer MNO services server 310, an ES12 register event message that includes information identifying a wireless device 102. In some embodiments, the information includes a unique hardware identifier associated with the wireless device 102, such as a device serial number or an international mobile equipment identifier (IMEI) value. At 508, the MNO services server 310 sends, to a first device services server 308-A, a message querying whether the wireless device 102 identified by the ES12 register message is eligible to be used with a dynamic SIM activation policy. At 510, the first device services server 308-A determines whether the wireless device 102 supports use of a flexible SIM activation policy and returns, to the MNO services server 310 at 512, an indication regarding support, e.g., a true or false value. When the wireless device 102 supports the flexible SIM activation policy, the MNO services server 310, at 514, provides to the first devices services server 308-A a unique MNO identifier (ID) value for the MNO 114 and a unique eUICC 108 identifier (EID) value for the eUICC 108 included in the wireless device 102. At 516, the first device services server 308-A applies a restrictive SIM activation policy to lock the wireless device 102 to the MNO 114 identified by the MNO ID value. At 518, the first device services server 308-A returns a success or failure indication to the MNO services server 310, which forwards the success or failure indication, at 520, to the MNO infrastructure server 312. As a result of the optional device pre-configuration process, when successfully applied, records for the wireless device 102 maintained by the first device services server 308-A and by one or more MNO infrastructure servers 312 indicate that cellular wireless service access capability for the wireless device 102 is restricted to use a cellular wireless service subscription with the MNO 114.

At 522, a device setup process is started, such as part of an out-of-box unbricking of the wireless device 102 or after a resetting the wireless device 102 to a device factory settings. At 524, the wireless device 102 sends to the first device services server 308-A managed by an OEM of the wireless device 102 a device activation request message that includes activation information for configuring the wireless device 102. The activation information includes a unique hardware device identifier for the wireless device 102, such as a device serial number or an international mobile equipment identifier (IMEI) value. At 526, the first device services server 308-A determines whether a flexible SIM activation policy (which can also be referred to as a temporary or loaner SIM activation policy) applies to the wireless device 102 identified by the unique hardware device identifier provided in the activation information of the device activation request message. In some embodiments, the wireless device 102 ships from a manufacturing facility tagged for initial configuring with the flexible SIM activation policy. In some embodiments, the wireless device 102 ships with a set of security libraries and directives to allow the device to proceed through the device setup process in a restricted mode without requiring an activated SIM to be installed in the wireless device 102. The flexible SIM activation policy allows the wireless device 102 to be setup without a fully functional cellular wireless capability enabled and restricts wireless capability to non-cellular wireless access connectivity, such as via a wireless local area network (WLAN) or wireless personal area network (WPAN) until a fully functional cellular wireless SIM profile is installed and activated in the wireless device 102.

Figure 5B:
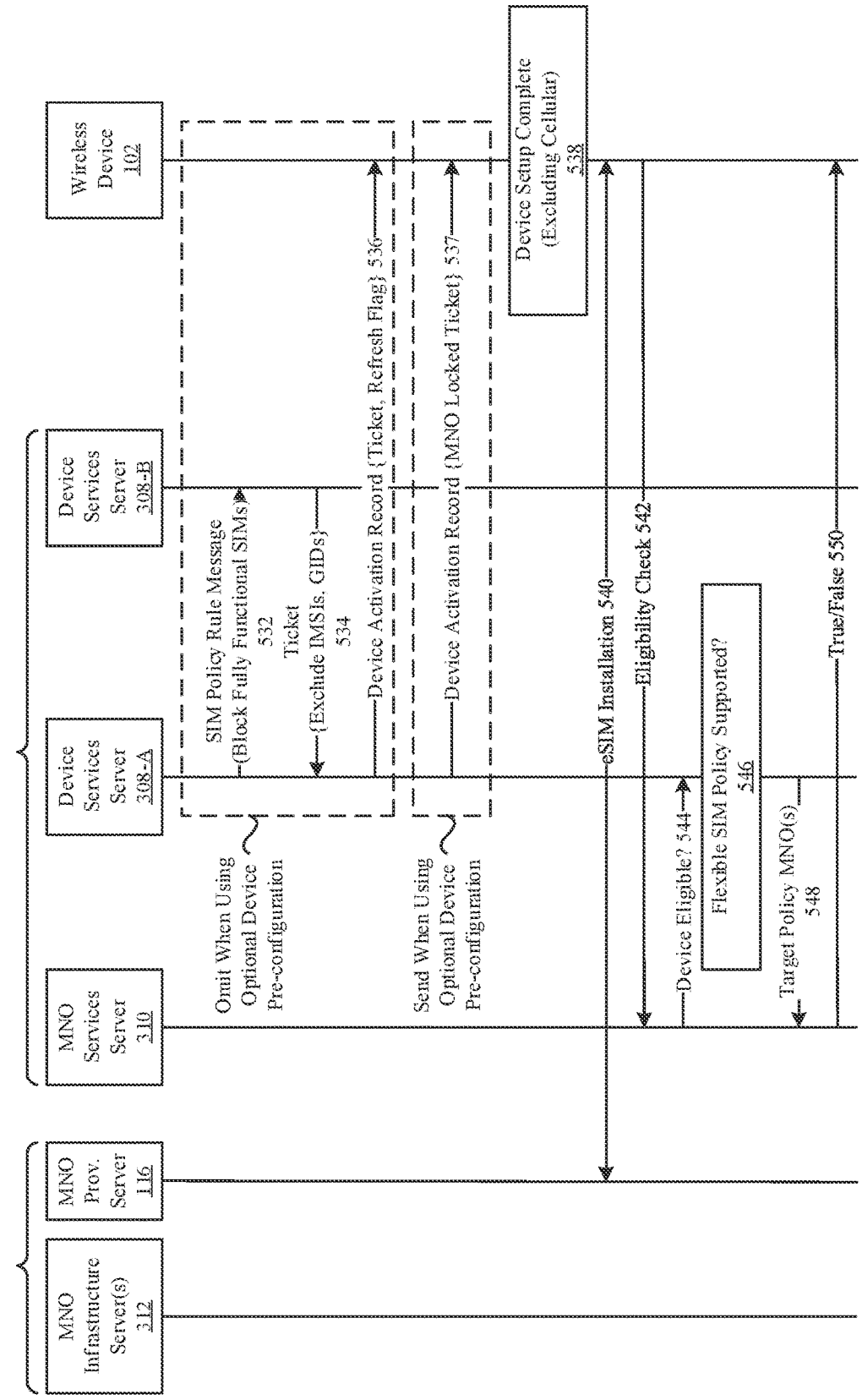

FIG. 5B illustrates a diagram 530 continuing the flexible SIM activation flow for the eSIM equipped wireless device 102. When the optional pre-configuration process of steps 506 to 520 has not been performed, at 532, the first device services server 308-A sends a SIM policy rule message that blocks use of fully functional cellular wireless SIM profiles for the wireless device 102 to the second device services server 308-B. At 534, the second device services server 308-B returns to the first device services server 308-A a device activation ticket that includes a rule to exclude the use of all IMSI and group identifier (GID) values for any fully functional cellular wireless SIM profiles. At 536, the first device services server 308-A sends to the wireless device 102 a device activation record that includes the device activation ticket and a refresh flag. When the optional pre-configuration process of steps 506 to 520 has been performed, the flexible SIM activation flow omits steps 532 to 536 and proceeds directly from step 520 to implement step 537, which is used instead of step 536. At 537, the first device services server 308-A sends to the wireless device 102 a device activation record that includes an MNO locked device activation ticket based on the particular MNO 114 identified at 514 and to which the wireless device 102 was pre-configured. At 538, the wireless device 102 completes the device setup process without activation of cellular wireless capability for the wireless device 102. At this point, the wireless device 102 can be used without cellular wireless capability.

Subsequently, at 540, the wireless device 102, downloads from an MNO provisioning server 116, an eSIM 208 to an eUICC 108 included in the wireless device 102. In some embodiments, the eSIM 208 is associated with a particular MNO 114 with which the user of the wireless device 102 has established a cellular wireless subscription for access to cellular wireless services of the particular MNO 114. In some embodiments, the user purchases the wireless device 102 with a service contract that includes a subsidy lock that limits cellular wireless access by the wireless device 102 to the particular MNO 114. At 542, the wireless device 102 sends an eligibility check message to the MNO services server 310 to determine eligibility for installed eSIM 208 to be used with the wireless device 102. At 544, the MNO services server 310 sends, to the first device services server 308-A, a message querying whether the wireless device 102 is eligible to be used with a dynamic SIM activation policy. In some embodiments, the eligibility check message sent at 542 includes an identifier for the wireless device 102. At 546, the first device services server 308-A determines whether the wireless device 102 supports use of a flexible SIM activation policy. At 548, the first device services server 308-A sends a message to the MNO services server 310 indicating one or more target SIM activation policies for one or more MNOs 114. At 550, the MNO services server 310 provides an indication, e.g., a true or false value, indicating whether the eSIM installed in the wireless device 102 is eligible for use with the wireless device 102 under the flexible SIM activation process. In some embodiments, when the wireless device 102 has been pre-configured for use with a particular MNO 114, the first device services server 308-A returns an eligibility result (e.g., a true or false value) at 550 based on whether the eSIM installed in the wireless device 102 at 540 is associated with the particular MNO 114 with which the wireless device 102 was previously pre-configured to be used.

Figure 5C:
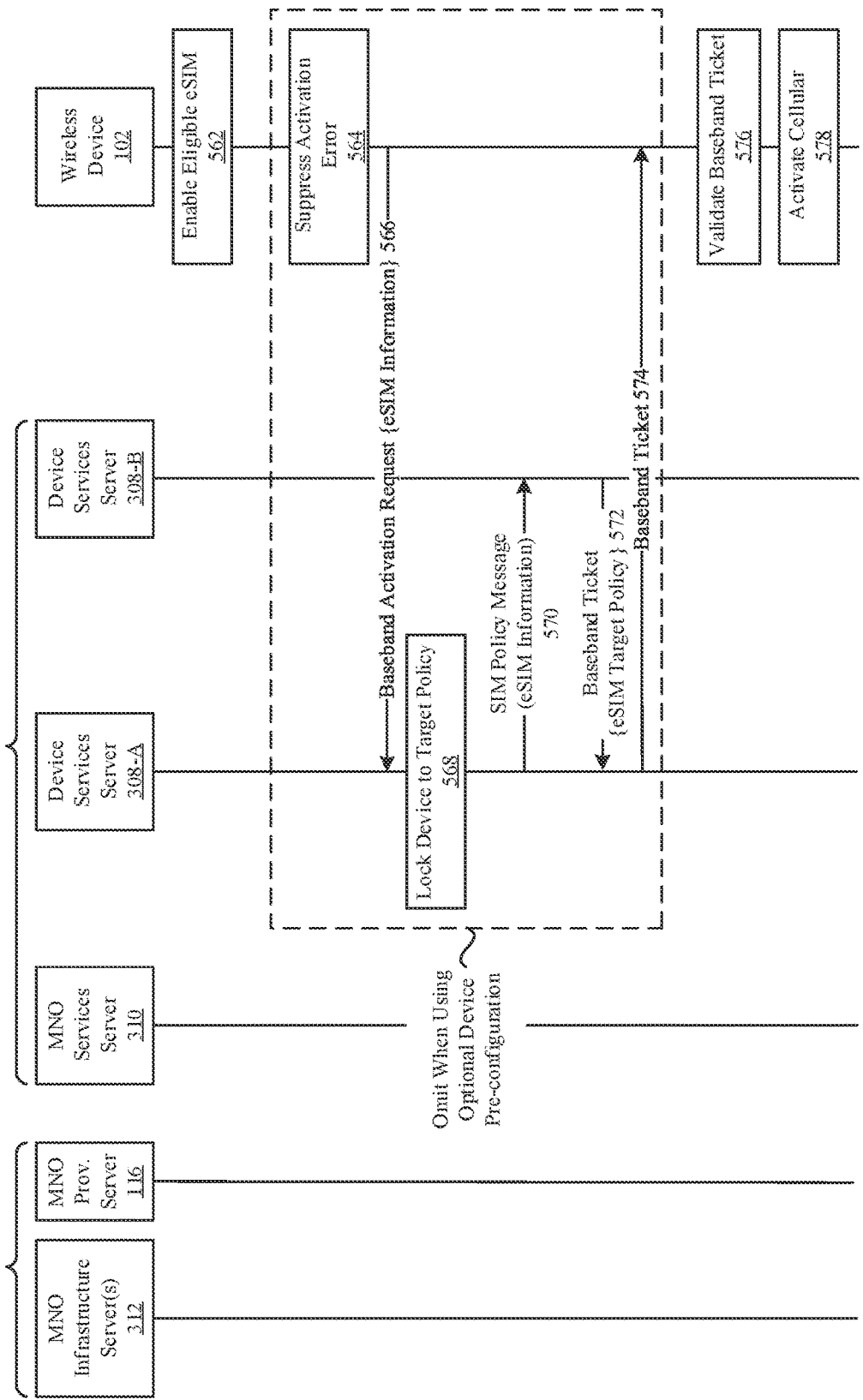

FIG. 5C illustrates a diagram 560 further continuing the flexible SIM activation flow for the eSIM equipped wireless device 102. At 562, when the eSIM 208 installed previously is eligible for use with the wireless device 102 under the flexible SIM activation process, the wireless device 102 enables the eSIM 208. When the optional device pre-configuration process of steps 506 to 520 has been performed, the flexible SIM activation procedure proceeds directly to step 576 and omits steps 564 to 574. When the optional device-pre-configuration process of steps 506 to 520 has not been performed the flexible SIM activation procedure continues with step 564. At 564, the wireless device 102 suppresses a cellular wireless service activation error, e.g., refrains from providing an on-display notification, that may occur as a result of the previously installed SIM policy rule that temporarily blocks use of fully functional cellular wireless SIM profiles by the wireless device 102. At 566, the wireless device 102 sends to the first device services server 308-A a baseband activation request message that includes information identifying the eSIM 208 profile installed on the eUICC 108 of the wireless device 102. In some embodiments, the information includes a unique identifier for the eSIM 208 profile, such as an international mobile subscription identifier (IMSI) value. In some embodiments, the information further includes GID values for the eSIM 208 profile. At 568, the first device services server 308-A locks the wireless device 102 to a target SIM activation policy that requires use of the wireless device 102 with an MNO 114 associated with the eSIM 208 profile installed at 540. In some embodiments, the first device services server 308-A uses the information included in the baseband activation request message to identify the MNO 114 and/or determine compatibility of the wireless device 102 for use with the MNO 114 associated with the eSIM 208 profile. At 570, the first device services server 308-A sends a SIM policy message that includes the information identifying the eSIM 208 profile to the second device services server 308-B. At 572, the second devices services server 308-B returns, to the first devices services server 308-A, a baseband ticket with a target SIM policy tailored to the eSIM 208 profile. At 572, the first device services server 308-A sends to the wireless device 102 a baseband ticket, which the wireless device 102 validates, at 576, such as based on a certificate pre-installed in the wireless device 102. The baseband ticket can indicate to the wireless device 102 that use of the eSIM 208 profile installed on the eUICC 108 is allowed for the wireless device 102 and that the wireless device 102 is locked to the MNO 114 associated with the eSIM 208 profile for cellular wireless service access. At 578, the baseband cellular wireless capability of the eSIM 208 profile is activated to allow the wireless device 102 to access cellular wireless services of the MNO 114 associated with the eSIM 208 profile. In some embodiments, the wireless device 102 is restricted from installing and activating a pSIM profile or an eSIM 208 profile associated with a different MNO 114 based on the updated SIM policy that locks the wireless device 102 to the MNO 114 associated with the already installed eSIM 208 profile. In some embodiments, the functions provided by the devices services servers 308-A, 308-B can be realized using a single server or more than two distinct servers.

Figure 6:
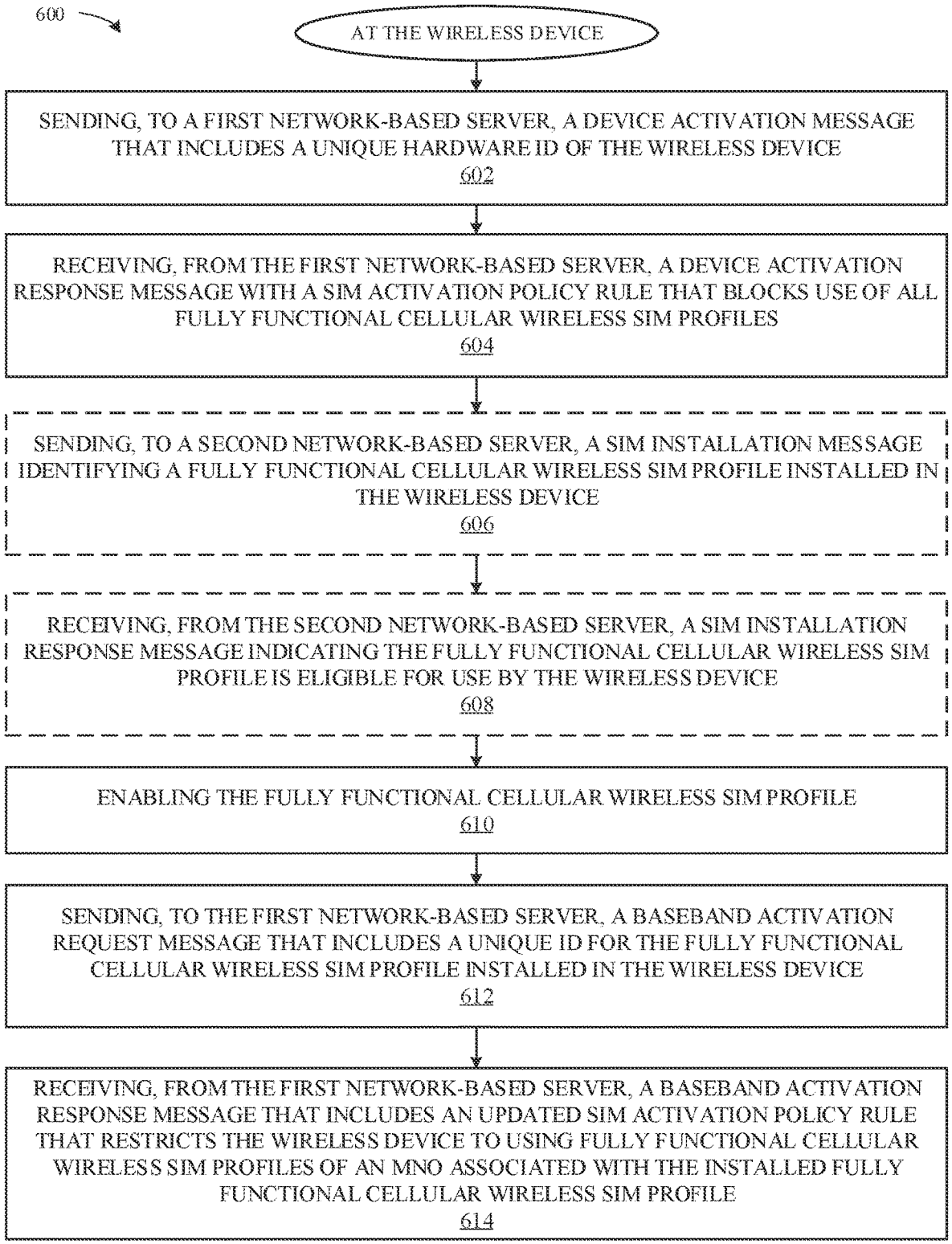
FIG. 6 illustrates an exemplary method for dynamic SIM activation policy updating performed by a wireless device, according to some embodiments.

FIG. 6 illustrates a flowchart 600 of an exemplary method for dynamic SIM activation policy updating performed by a wireless device 102. At 602, the wireless device 102 sends, to a first network-based server, a device activation message that includes a unique hardware identifier of the wireless device 102. At 604, the wireless device 102 receives, from the first network-based server, a device activation response message that includes a SIM activation policy rule that blocks use of all fully functional cellular wireless SIM profiles by the wireless device 102. Optionally, in some embodiments, at 606, the wireless device 102 sends, to a second network-based server, a SIM installation message that identifies a fully functional cellular wireless SIM profile installed in the wireless device 102. Optionally, in some embodiments, at 608, the wireless device 102 receives, from the second network-based server, a SIM installation response message that indicates the fully functional cellular wireless SIM profile installed in the wireless device 102 is eligible to be used by the wireless device 102. At 610, the wireless device 102 enables the fully functional cellular wireless SIM profile. At 612, the wireless device 102 sends, to the first network-based server, a baseband activation request message that includes a unique identifier for the fully functional cellular wireless SIM profile installed in the wireless device 102. At 614, the wireless device 102 receives, from the first network-based server, a baseband activation response message that includes an updated SIM activation policy rule that restricts the wireless device 102 to using fully functional cellular wireless SIM profiles of an MNO 114 associated with the installed fully functional cellular wireless SIM profile.

Figure 7A:
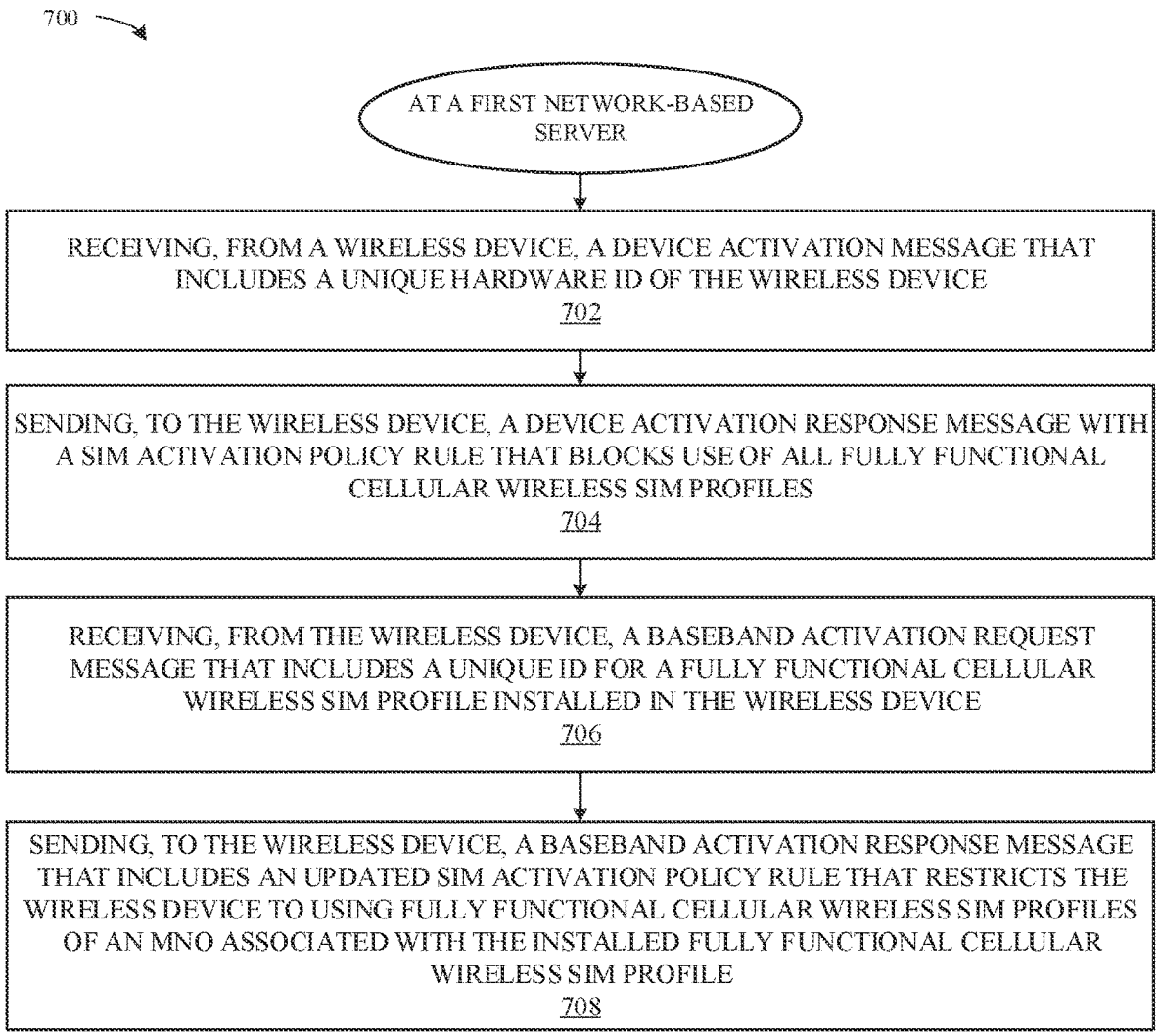
FIGS. 7A and 7B illustrate exemplary sets of actions performed by network-based servers for dynamic SIM activation policy updating of a wireless device, according to some embodiments.
Figure 7B:
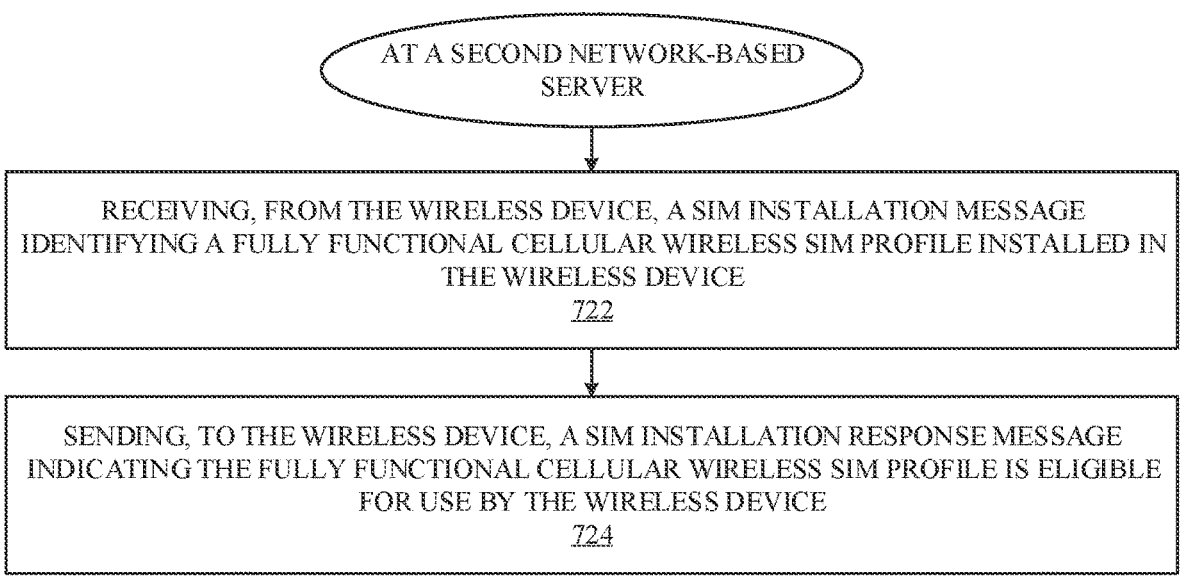

FIGS. 7A and 7B illustrate flowcharts 700, 720 of exemplary sets of actions performed by network-based servers for dynamic SIM activation policy updating of a wireless device 102. At 702, a first network-based server receives, from a wireless device 102, a device activation message that includes a unique hardware identifier of the wireless device 102. At 704, the first network-based server sends, to the wireless device 102, a device activation response message that includes a SIM activation policy rule that blocks use of all fully functional cellular wireless SIM profiles by the wireless device 102. At 706, the first network-based server, receives, from the wireless device 102, a baseband activation request message that includes a unique identifier for a fully functional cellular wireless SIM profile installed in the wireless device 102. At 708, the first network-based server sends, to the wireless device 102, a baseband activation response message that includes an updated SIM activation policy rule that restricts the wireless device 102 to using fully functional cellular wireless SIM profiles of an MNO 114 associated with the installed fully functional cellular wireless SIM profile. At 722, a second network-based server receives, from the wireless device 102, a SIM installation message identifying a fully functional cellular wireless SIM profile installed in the wireless device 102. At 724, the second network-based server sends, to the wireless device 102, a SIM installation response message that indicates the fully functional cellular wireless SIM profile is eligible for use by the wireless device 102.

Figure 8:
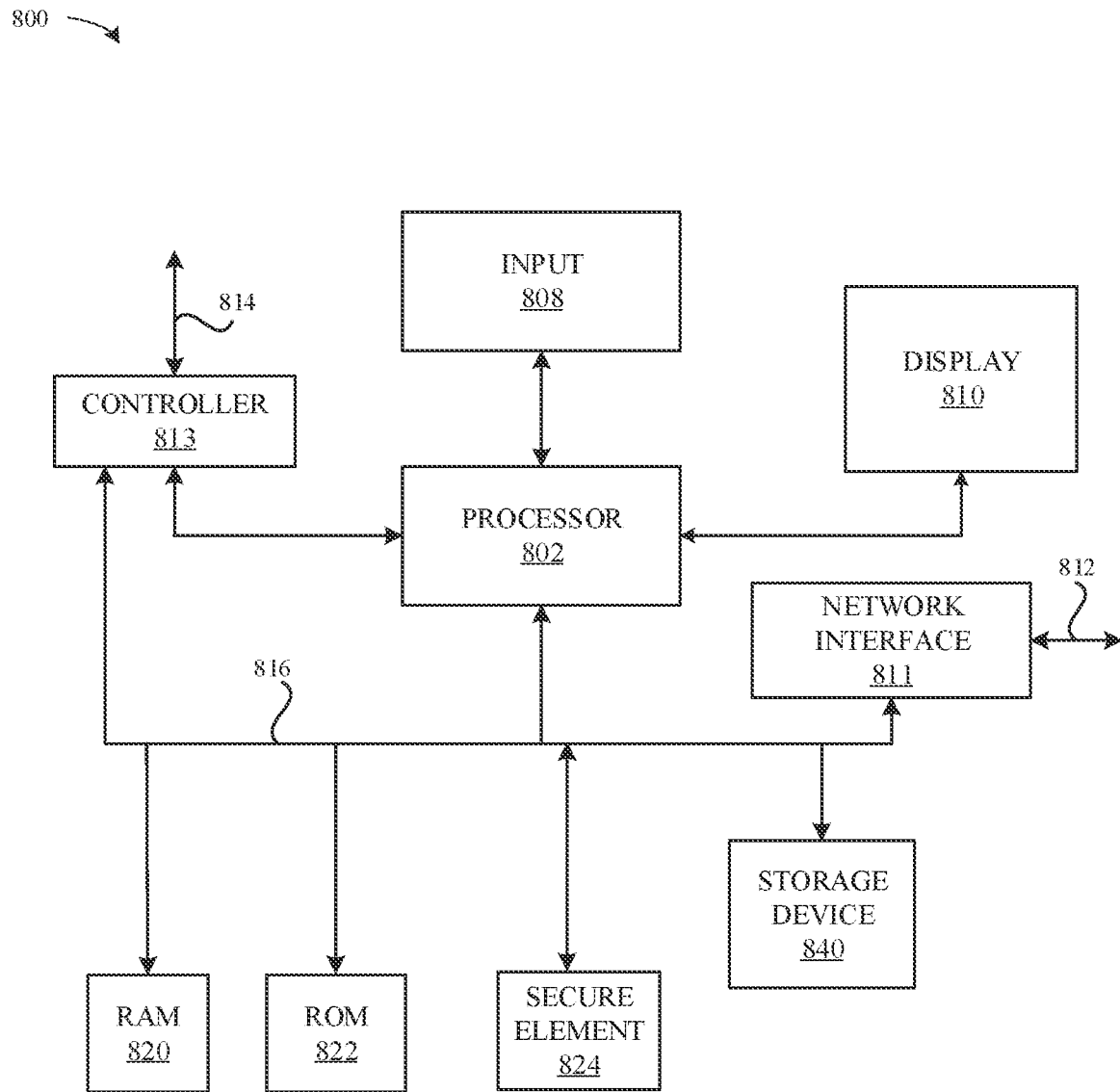
FIG. 8 illustrates a block diagram of exemplary elements of a wireless device, according to some embodiments.

FIG. 8 illustrates a detailed view of a representative computing device 800 that can be used to implement various methods described herein, according to some embodiments. In particular, the detailed view illustrates various components that can be included in the wireless device 102. As shown in FIG. 8, the computing device 800 can include a processor 802 that represents a microprocessor or controller for controlling the overall operation of computing device 800. The computing device 800 can also include a user input device 808 that allows a user of the computing device 800 to interact with the computing device 800. For example, the user input device 808 can take a variety of forms, such as a button, keypad, dial, touch screen, audio input interface, visual/image capture input interface, input in the form of sensor data, etc. Still further, the computing device 800 can include a display 810 that can be controlled by the processor 802 to display information to the user. A data bus 816 can facilitate data transfer between at least a storage device 840, the processor 802, and a controller 813. The controller 813 can be used to interface with and control different equipment through an equipment control bus 814. The computing device 800 can also include a network/bus interface 811 that communicatively couples to a data link 812. In the case of a wireless connection, the network/bus interface 811 can include a wireless transceiver.

The computing device 800 also includes a storage device 840, which can comprise a single disk or a plurality of disks (e.g., hard drives), and includes a storage management module that manages one or more partitions within the storage device 840. In some embodiments, storage device 840 can include flash memory, semiconductor (solid state) memory or the like. The computing device 800 can also include a Random Access Memory (RAM) 820 and a Read-Only Memory (ROM) 822. The ROM 822 can store programs, utilities or processes to be executed in a non-volatile manner. The RAM 820 can provide volatile data storage, and stores instructions related to the operation of the computing device 800. The computing device 800 can further include a secure element (SE) 824, which can represent secure storage for cellular wireless system access by the wireless device 102, such as an eUICC 108 on which to store one or more eSIMs 208 and/or a UICC 118 on which to store a pSIM profile.

Wireless Terminology

In accordance with various embodiments described herein, the terms "wireless communication device," "wireless device," "mobile wireless device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) Long Term Evolution (LTE), LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different third generation (3G) and/or second generation (2G) RATs. In these scenarios, a multi-mode UE can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

Regarding the present disclosure, it is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for dynamic subscriber identity module (SIM) activation policy updating of a wireless device, the method comprising:
by the wireless device:
generating and subsequently sending, to a first network-based server, a device activation request message that includes a unique hardware identifier (ID) of the wireless device;
receiving, from the first network-based server, responsive to successful determination that the wireless device supports dynamic SIM activation policy updating, a device activation response message that includes a SIM activation policy rule that blocks use of all fully functional cellular wireless SIM profiles by the wireless device;
generating and subsequently sending, to the first network-based server, a baseband activation request message that includes a unique identifier for a fully functional cellular wireless SIM profile installed in the wireless device;
receiving, from the first network-based server, a baseband activation response message that includes an updated SIM activation policy rule that restricts the wireless device to using fully functional cellular wireless SIM profiles of a mobile network operator (MNO) associated with the fully functional cellular wireless SIM profile identified by the unique identifier; and
configuring the wireless device in accordance with the updated SIM activation policy rule.

2. The method of claim 1, further comprising:
by the wireless device:
sending, to a second network-based server after receipt of the device activation response message, a SIM installation message identifying the fully functional cellular wireless SIM profile installed in the wireless device;
receiving, from the second network-based server, a SIM installation response message indicating the fully functional cellular wireless SIM profile is eligible for use by the wireless device; and
enabling the fully functional cellular wireless SIM profile in the wireless device.

3. The method of claim 1, wherein the fully functional cellular wireless SIM profile comprises a physical SIM (pSIM) on a universal integrated circuit card (UICC) installed in the wireless device, the pSIM configured for access to cellular wireless services of the MNO.

4. The method of claim 1, wherein the fully functional cellular wireless SIM profile comprises an electronic SIM (eSIM) downloaded to an embedded universal integrated circuit card (eUICC) of the wireless device from a provisioning server of the MNO.

5. The method of claim 1, wherein the unique hardware ID included in the device activation request message comprises a serial number of the wireless device.

6. The method of claim 5, wherein the device activation request message further includes an embedded universal integrated circuit card (eUICC) identifier (EID) value of the eUICC of the wireless device.

7. The method of claim 1, wherein the unique identifier for the fully functional cellular wireless SIM profile included in the baseband activation request message comprises an international mobile subscriber identity (IMSI) value.

8. The method of claim 1, further comprising:
by the wireless device:
validating the baseband activation response message based on a certificate associated with the first network-based server installed in the wireless device; and
after successful validation of the baseband activation response message, activating cellular baseband capability of the wireless device to enable use of the fully functional cellular wireless SIM profile.

9. The method of claim 8, wherein the certificate is installed in the wireless device during manufacture of the wireless device.

10. A method for dynamic subscriber identity module (SIM) activation policy updating of a wireless device, the method comprising:
by a first network-based server:
receiving, from the wireless device, a device activation request message that includes a unique hardware identifier (ID) of the wireless device;

determining, based at least in part on identification of the wireless device, whether the wireless device supports use of a dynamic SIM activation policy;

generating and subsequently sending, to the wireless device responsive to successful determination that the wireless device supports dynamic SIM activation policy updating, a device activation response message that includes a SIM activation policy rule that blocks use of all fully functional cellular wireless SIM profiles by the wireless device;

receiving, from the wireless device, a baseband activation request message that includes a unique identifier for a fully functional cellular wireless SIM profile installed in the wireless device;

determining an updated SIM activation policy rule for the wireless device to restrict the wireless device to use fully functional cellular wireless SIM profiles of a mobile network operator (MNO) associated with the fully functional cellular wireless SIM profile identified by the unique identifier; and generating and subsequently sending, to the wireless device, a baseband activation response message that includes the updated SIM activation policy rule.

11. The method of claim 10, further comprising:
by a second network-based server:
receiving, from the wireless device after sending the device activation response message, a SIM installation message identifying the fully functional cellular wireless SIM profile installed in the wireless device; and sending, to the wireless device, a SIM installation response message indicating the fully functional cellular wireless SIM profile is eligible for use by the wireless device.

12. The method of claim 10, wherein the fully functional cellular wireless SIM profile comprises a physical SIM (pSIM) on a universal integrated circuit card (UICC) installed in the wireless device, the pSIM configured for access to cellular wireless services of the MNO.

13. The method of claim 10, wherein the fully functional cellular wireless SIM profile comprises an electronic SIM (eSIM) downloaded to an embedded universal integrated circuit card (eUICC) of the wireless device from a provisioning server of the MNO.

14. The method of claim 10, wherein unique hardware ID included in the device activation request message comprises a serial number of the wireless device.

15. The method of claim 14, wherein the device activation request message further includes an embedded universal integrated circuit card (eUICC) identifier (EID) value of the eUICC of the wireless device.

16. The method of claim 10, wherein the unique identifier for the fully functional cellular wireless SIM profile included in the baseband activation request message comprises an international mobile subscriber identity (IMSI) value.

17. A wireless device comprising:
wireless circuitry comprising one or more antennas; and
one or more processors communicatively coupled to the wireless circuitry and to a memory storing instructions that, when executed by the one or more processors, cause the wireless device to dynamically update a subscriber identity module (SIM) activation policy of the wireless device by at least:

generating and subsequently sending, to a first network-based server, a device activation request message that includes a unique hardware identifier (ID) of the wireless device;

receiving, from the first network-based server, responsive to successful determination that the wireless device supports dynamic SIM activation policy updating, a device activation response message that includes a SIM activation policy rule that blocks use of all fully functional cellular wireless SIM profiles by the wireless device;

generating and subsequently sending, to the first network-based server, a baseband activation request message that includes a unique identifier for a fully functional cellular wireless SIM profile installed in the wireless device;

receiving, from the first network-based server, a baseband activation response message that includes an updated SIM activation policy rule that restricts the wireless device to using fully functional cellular wireless SIM profiles of a mobile network operator (MNO) associated with the fully functional cellular wireless SIM profile identified by unique identifier; and configuring the wireless device in accordance with the updated SIM activation policy rule.

18. The wireless device of claim 17, wherein execution of the instructions further cause the wireless device to:
send, to a second network-based server after receipt of the device activation response message, a SIM installation message identifying the fully functional cellular wireless SIM profile installed in the wireless device;

receive, from the second network-based server, a SIM installation response message indicating the fully functional cellular wireless SIM profile is eligible for use by the wireless device; and enable the fully functional cellular wireless SIM profile in the wireless device.

19. The wireless device of claim 17, the unique hardware ID included in the device activation request message comprises a serial number of the wireless device.

20. The wireless device of claim 17, wherein execution of the instructions further cause the wireless device to:
validate the baseband activation response message based on a certificate associated with the first network-based server installed in the wireless device; and after successful validation of the baseband activation response message, activate cellular baseband capability of the wireless device to enable use of the fully functional cellular wireless SIM profile.

* * * * *